(12) United States Patent
Schüler et al.

(10) Patent No.: US 12,165,001 B2
(45) Date of Patent: Dec. 10, 2024

(54) LOCATING CODE IMAGE ZONES IN AN IMAGE OF A CODE BEARING OBJECT

(71) Applicant: SICK AG, Waldkirch (DE)

(72) Inventors: Pascal Schüler, Waldkirch (DE);
Christofer Roser, Waldkirch (DE);
Thorsten Falk, Waldkirch (DE);
Sascha Burghardt, Waldkirch (DE);
Romain Müller, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 18/108,243

(22) Filed: Feb. 10, 2023

(65) Prior Publication Data

US 2023/0267293 A1 Aug. 24, 2023

(30) Foreign Application Priority Data

Feb. 21, 2022 (EP) ..................................... 22157758

(51) Int. Cl.
*G06K 7/14* (2006.01)

(52) U.S. Cl.
CPC ......... *G06K 7/1443* (2013.01); *G06K 7/1413* (2013.01); *G06K 7/1417* (2013.01)

(58) Field of Classification Search
CPC .. G06K 7/1443; G06K 7/1413; G06K 7/1417; G06K 19/06037; G06K 19/06103; G06K 19/06028
USPC ............... 235/462.09, 462.1, 462.07, 462.11
See application file for complete search history.

(56) References Cited

U.S. PATENT DOCUMENTS

| 10,650,211 | B2 | 5/2020 | Olivastri | |
|---|---|---|---|---|
| 2016/0267355 | A1* | 9/2016 | Piao | ................... G06F 18/285 |
| 2019/0019086 | A1 | 1/2019 | Schuler | |
| 2020/0034782 | A1* | 1/2020 | Hsieh | ................. G06Q 30/0627 |
| 2020/0380229 | A1 | 12/2020 | Peruch et al. | |

FOREIGN PATENT DOCUMENTS

| DE | 10137093 A1 | 2/2003 |
|---|---|---|
| DE | 102018109392 A1 | 10/2019 |
| EP | 1879145 A1 | 1/2008 |
| EP | 3428834 A1 | 1/2019 |
| EP | 3428834 B1 | 1/2019 |
| EP | 3916633 A1 | 12/2021 |
| JP | 2000-48120 A | 2/2000 |

(Continued)

OTHER PUBLICATIONS

Hansen, et al.; "Real-Time Barcode Detection and Classification using Deep Learning"; Aalborg University, Rendsburggade 14, 9000 Aalborg, Denmark.

(Continued)

*Primary Examiner* — Edwyn Labaze
(74) *Attorney, Agent, or Firm* — Nath, Goldberg & Meyer; Jerald L. Meyer; Morgan D Rosenberg

(57) ABSTRACT

A method of locating code image zones in an output image of a code bearing object (14), wherein first candidates for code image zones are determined in a first segmentation process using a process of classical image processing without machine learning and second candidates for code image zones are determined in a second segmentation process using machine learning, with the first and second candidates being fused to locate the code image zones.

22 Claims, 5 Drawing Sheets

(56) References Cited

FOREIGN PATENT DOCUMENTS

Figure 1:
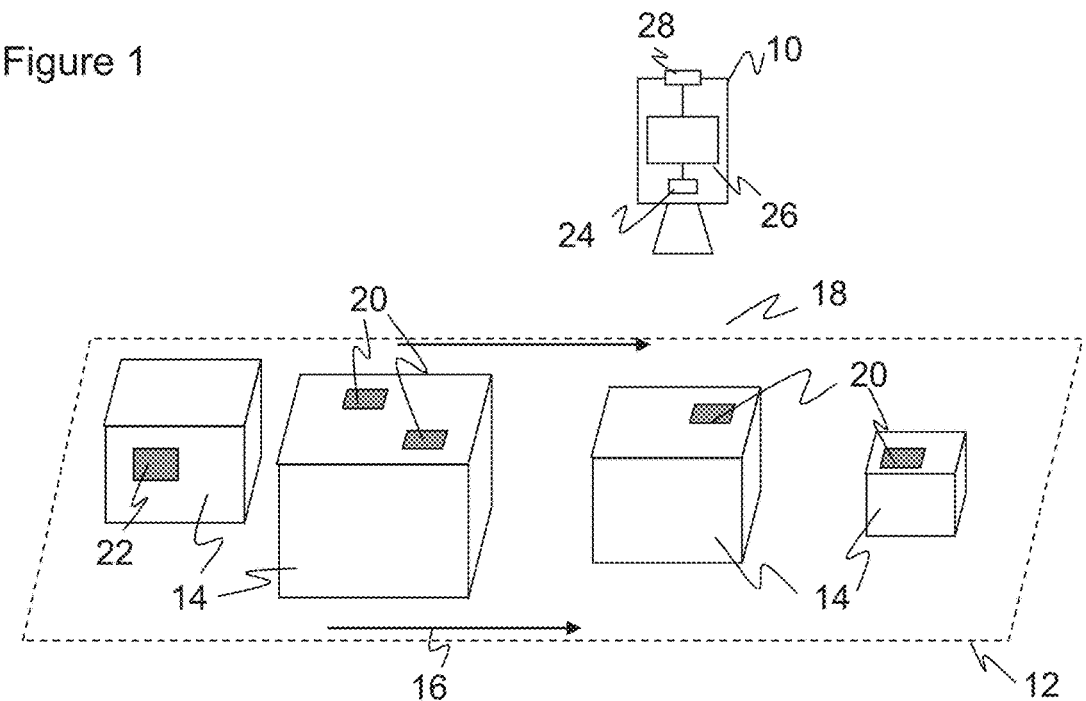

| JP | 2002-150213 A | 5/2002 |
|---|---|---|
| JP | 2013-41315 A | 2/2013 |

OTHER PUBLICATIONS

Zhao, et al.; "Deep Dual Pyramid Network for Barcode Segmentation using Barcode-30k Database"; Institute of Computer Science and Technology, Peking University; Tsinghua University.
Xiao, et al.; "1D Barcode Detection via Integrated Deep-Learning and Geometric Approach"; College of Computer Science, National University of Defense Technology, Changsha 410000, China; College of Computer Science and Software Engineering, Shenzhen University, Shenzhen 518000, China; Published: Aug. 9, 2019.
Zharkov, et al.; "Universal Barcode Detector via Semantic Segmentation", R&D Department ABBYY Production LLC Moscow, Russia; Phystech School of Applied Mathematics and Informatics Moscow Institute of Physics and Technology (National Research University).
Meng, et al., Label and Barcode Detection in Wide Angle Image, Master Thesis, Embedded and Intelligent Systems, 120ECTS, Halmstad University, Jun. 2013.

\* cited by examiner

LOCATING CODE IMAGE ZONES IN AN IMAGE OF A CODE BEARING OBJECT

The invention relates to a computer implemented method of locating code image zones in an output image of a code bearing object in accordance with the preamble of claim 1 and to an optoelectronic code reader in accordance with the preamble of claim 15 that uses a corresponding method.

Code readers are known from supermarket checkouts, for automatic parcel identification, for sorting mail shipments, from baggage handling at airports, and from other logistics applications. In a code scanner, a reading beam is guided transversely over the code by means of a rotating mirror or by means of a polygon mirror wheel. A camera based code reader records images of the objects having the codes located thereon with the aid of an image sensor and image evaluation software extracts the code information from these images. Camera based code readers also cope without problem with different code types than one-dimensional barcodes which also have a two-dimensional structure like a matrix code and provide more information.

In an important application group, the code bearing objects are conveyed past the code reader. A code scanner here detects the respective codes successively led into its reading zone. Alternatively, in a camera based code reader, a line scan camera reads in the object images having the code information successively and line-wise with the relative movement. As a rule, image data are recorded using a two-dimensional image sensor that overlap more or less depending on the recording frequency and on the conveying speed. So that the objects can be arranged in any desired orientation on the conveyor, a plurality of code readers are often provided at a reading tunnel to record objects from a plurality of sides or from all sides.

Code image zones, that is those zones in the image that may potentially contain a code, are sought in a recorded output image of a code bearing object as preparation for the reading of codes. This step is called segmentation or pre-segmentation. The recognition of code image zones is very easy for a human observer. Viewed algorithmically, it is, however, an exceptionally demanding task. For patterns or structures in the background often have very similar properties to the code image zones themselves. 2D codes having very small modules, for example, in a variety of regards have very similar properties such as text areas, logos, package tapes, and the like. The error rate of the segmentation is therefore conventionally still too high. In this respect, errors are to be distinguished by which zones with codes are overlooked (false negative) and by which a zone without a code is located as a code image zone (false positive). The first named error possibly prevents the automated processing controlled by the code information, provided that the object does not bear a plurality of redundant codes, whereas the last named error takes up the limited processing resources and available time windows so that a code in a different code image zone is possibly no longer read in time.

In most of today's code reading applications, the segmentation takes place by traditional image processing algorithms and by manually prepared classifiers. Even very small structures are thus often still recognized well and code image zones having small codes are thus also found, for example 2D codes with small module and symbol sizes or barcodes having a small code height or bar length. The conventional approach remains very local in its evaluation. In difficult reading situations, for instance with a large number of background structures, a large number of false positive code image zones are thereby located, however, that cannot all be processed under the typical real time conditions of the application and that thereby reduce the reading rate.

A different approach for the segmentation is based on artificial neural networks, in particular deep neural networks, convolutional neural networks (CNNs). Ultimately such a neural network applies a plurality of filter kernels trained using example data to the output image. This incremental application of a large number of filters makes a neural network very processing intensive. The image resolution therefore has to be greatly reduced in the first layers. There is the thereby the risk, however, of losing finer structures in the output image. The consequence is that smaller code image zones are overlooked, that there is therefore a relatively large rate of false negative errors. Code image zones that are not found directly influence the reading rate. Conversely, the located code image zones are very reliable; the rate of false positive errors is smaller in comparison with a classical segmentation approach.

In the paper "Deep Dual Pyramid Network for Barcode Segmentation using Barcode-30 k Database", arXiv preprint arXiv:1807.11886 (2018), a large data record is synthesized and thus a code segmentation by CNNs is carried out. The exact network architecture and hardware implementation are not presented.

Xiao, Yunzhe, and Zhong Ming, "1D Barcode Detection via Integrated Deep-Learning and Geometric Approach", Applied Sciences 9.16 (2019): 3268 claim a performance in the localization of barcodes improved by at least 5% with respect to previous approaches without parameters having to be set manually.

Hansen, Daniel Kold, et al, "Real-Time Barcode Detection and Classification using Deep Learning", IJCCI. 2017 recognize code zones including a rotation in real time using an Intel i5-6600 3.30 GHz and a Nvidia GeForce GTX 1080.

Zharkov, Andrey; Zagaynov, Ivan, Universal Barcode Detector via Semantic Segmentation, arXiv preprint arXiv:1906.06281, 2019 recognize barcodes and identify the code type in a CPU environment.

DE 101 37 039 A1 discloses a method of recognizing a code and a code reader in which the step of localizing the code within an image environment is carried out by means of a neural network. The training and architecture of the neural network are not described in detail. DE 10 2018 109 392 A1 proposes the use of convolutional neural networks for detecting optical codes. A further code reader is known from U.S. Pat. No. 10,650,211 B2 that uses convolutional neural networks for the locating of the codes in a recorded image.

EP 3 428 834 B1 uses a classical decoder that works with processes without machine learning to train a classifier configured for machine learning or more specifically a neural network. This document does not, however, deal in more detail with the preprocessing or the locating of code zones.

A camera and a method of processing image data are described in EP 3 916 633 A1 in which method a segmentation takes place by means of a neural network in a streaming process, i.e. image data are already processed while further image data are still being read. At least the first layers of the neural network can be implemented on an FPGA. This considerably reduces the processing times and the demands on the hardware, but the segmentation itself is not improved thereby.

Only either a classical segmentation or a segmentation using neural networks has previously been used in the prior art. The possibility that both kinds of segmentation complement one another by their strengths and cancel out their weaknesses is thus not recognized and is not used.

It is therefore the object of the invention to further improve the segmentation or the locating of code image zones.

This object is satisfied by a computer implemented method of locating code image zones in an output image of a code bearing object in accordance with claim 1 and by an optoelectronic code reader in accordance with claim 15. At least one optical barcode or 2D code is affixed to the object or this is at least assumed. At least one code image zone, one image section (region of interest, ROI) having the code is preset in a recording of the object, the object image, with it not being precluded that the code was not also recorded due to the recording situation or the perspective, and it may also occur that the object actually does not bear any code at all or has lost it. The output image is recorded, for example, by a camera at the conveyor during a conveying movement or the object is presented to a camera in its field of view.

The locating of the code image zones, that is also called segmentation, is preferably a preparatory step of a method of reading optical codes in which the located code image zones are subsequently supplied to a decoder that reads the code content of the code in the respective code image zone or decodes the code.

First candidates for code image zones are determined in a first segmentation process. The first segmentation process works with processes of classical image processing, for example using filters selected and parameterized by hand. Classical image processing is delimited in that no process of machine learning and in particular no neural network is used. Classical here should accordingly be the opposite of machine reading. In this respect, the setting and adaptation of parameters are also possible in classical image processing, on its own this is not yet machine learning. Important practical differences are that the classical segmentation has already been begun by its programming for its task and does not first require experience or training and that its performance is more or less constant from the start up to and over its total running time. In machine learning, in contrast, all this by no means depends only on a programmed structure, but rather only results in conjunction with the training and the quality of the training data. Conventional classical segmentation would already be concluded by the determination of the first candidates; the first candidates would be the code image zones located after the segmentation.

The invention starts from the basic idea of combining the classical segmentation with a segmentation of machine learning. For this purpose, second candidates are determined for code image zones by a second segmentation process using machine learning. Conventional segmentation that is based on machine learning would on its own already be concluded by the determination of the second candidates without determination of any first candidates; the second candidates would be the code image zones located after the segmentation.

The first and second candidates found using the two different segmentation processes are subsequently combined in accordance with the invention to locate the code image zones. A common observation of the first and second candidates consequently takes place, a fusion of the two segmentations (smart fusion).

The invention has the advantage that the respective strengths of the two segmentation processes can be utilized by their combination. Classical segmentation tends to be fine grained and generates too many false positive code image zones that actually do not contain any code at all, while segmentation using machine learning tends to overlook codes and thus tends toward false negative errors. As already mentioned in the introduction, false positive code image zones cost valuable processing time, which possibly results in a reduced reading rate since at least some code image zones can no longer be evaluated under real time conditions or quasi real time conditions. Unread codes in overlooked code image zones directly reduce the reading rate. Errors of both the first and second kinds can be reduced by a smart fusion of the two segmentations. The fine graininess and accuracy of classical segmentation can thus be effectively combined with the selectivity of segmentation using machine learning and the total reading rate increases.

The first segmentation process advantageously generates a first result map and/or the second segmentation process generates a second result map, with a result map being an image of lower resolution than the output image whose pixels comprise information on whether a code image zone has been recognized at the location of the pixel. This is a representation of the first candidates and second candidates that is particularly simple to handle as a respective result map (heatmap). The two result maps are in particular combined in different manners depending on the embodiment of the invention to locate the code image zones (fused heatmap). Due to the lower resolution in comparison with the output image, each pixel of the result map stands for a certain region or tile of the output image and provides information in a binary manner or using a scoring value as to whether it is part of a code image zone or not or how likely a code (portion) had been recorded in this tile, possibly also with classification information such as which code type it presumably is.

Subsequently to the locating of the candidates, a fine segmentation preferably takes place in which the code image zones are delineated more finely, in particular in the resolution of the output image. Information on the position of a code image zone does not yet necessarily contain the exact borders of the code. The code image zone is, for example, only localized in its coarse resolution in the case of result maps. The fine segmentation improves the borders of the code image zones, preferably with pixel accuracy in the resolution of the output image. First candidates, second candidates, and/or code image zones located after the fusing can be finely segmented.

A code image zone is preferably deemed to have been located in the output image where a first candidate and a second candidate have been determined or alternatively where a first or second candidate has been determined. A logical AND operation or alternatively a logical OR operation of the two segmentation processes thus takes place. With an AND, both segmentation processes must confirm a candidate so that a code image zone is deemed to have been located; with an OR, a candidate in only one of the two segmentation processes is sufficient. The AND or OR is generally to be understood semantically, i.e. both conditions are set cumulatively or alternatively only one condition is set. In the case of result maps, it is preferably linked by an image processing operation that links pixels with AND or OR. The first and second result maps are therefore combined to form a third result map by means of AND or OR. If the result maps are not binary, an equivalent is to be selected, for instance that a scoring value in both pixels or an added scoring value of both pixels has to exceed a threshold or that this is sufficient in one of the two pixels to locate a code image zone. The combination by means of AND tends to be too sharp; code image zones may be lost here. False negative errors tend to result here and hardly any false positive errors. Conversely, the combination by means of OR tends to be too soft; too many ostensible code image zones result while hardy any code image zones are overlooked. Additional steps such as subsequently described therefore preferably takes place to further reduce both kinds of error.

The first candidates are preferably complemented to form connected code image zones in particular by means of connected component processes, wherein only small first candidates are maintained that are smaller than a threshold size and wherein in particular the small first candidates are additionally considered as code image zones. This step preferably follows once first candidates and second candidates had already been fused once, in particular to form a third result map to locate additional code image zones. Particularly after an AND operation, small code image zones tend to have been eliminated because the second segmentation process with machine learning has overlooked them and thus has not confirmed them. The results of the first segmentation process are therefore reworked again to find first candidates and as a consequence small code image zones in a targeted manner. The first candidates are first completed to form connected components or so-called blobs. A size filter is then applied that only keeps small first candidates. The size filter is based, for example, on a pixel number or another measurement such as length, width, or diameter. The small first candidates are then preferably deemed to be additional code image zones. They can be found or collected in a fourth result map. The third result map can then in particular be combined with the fourth result map by means of OR to obtain a fifth result map. In this case, the fifth result map results overall as a first result map AND second result map (equal to a third result map) OR fourth result map. This fifth result map now indicates where code image zones are located that the first segmentation process and the second segmentation process have found plus code image zones corresponding to the small first candidates.

The second candidates are preferably complemented to form connected code image zones in particular by means of connected component processes, wherein only exclusive second candidates are maintained whose position does not coincide with a position of an already located code image zone and wherein in particular the exclusive second candidates are additionally considered as code image zones. The second segmentation process can also be looked at again. It is again preferably a question of an AND operation possibly having lost a second candidate because there is no corresponding first candidate. The comparatively large second candidates may, however, not simply overwrite the first candidates in the sense of an OR operation. The typical error case is a stack code having a plurality of small barcodes above one another. The finer first segmentation process can separate these barcodes. These separated code image zones should not be merged by a large area second candidate. Exclusive second candidates are therefore first sought, that is a check is made whether a code image zone had not already been located at the position of the respective second candidate that has accumulated into a connection component or blob. Only if this is not the case is it an exclusive second candidate and only the exclusive second candidates are added as additional code image zones. The exclusive second candidates can be found or collected in a sixth result map and the fusion then takes place at the level of result maps. The sixth result map can be linked with the third result map or with the fifth result map by means of OR. A seventh result map or overall result map results from this.

Small first candidates and exclusive second candidates are particularly preferably added to an AND operation of the first candidates and second candidates. This produces the following cascade using result maps: The first result map of the first candidates is fused with the second result map of the second candidates by an AND operation to form a third result map. The first candidates are accumulated into connected blobs and only blobs up to a threshold value or maximum value are kept as small first candidates: this produces a fourth result map. The third result map and the fourth result map are fused to form a fifth result map by an OR operation. The second components are accumulated into connected blobs and only blobs are kept as exclusive second candidates that do not correspond to already located code image zones: this produces a sixth result map. The OR operation on the fifth result map and on the sixth result map results in the overall result map with all the code image zones that were located in accordance with this preferred embodiment.

A scoring (score value) is preferably determined with respect to the first candidates, the second candidates, and/or the code image zones that indicates how reliably an optical code in the output image has been recognized at the represented position. The AND or OR operations can thus be further differentiated, for example by means of voting or weighting. If a scoring into which scores of the underlying candidates enter has been assigned to the code image zones, the downstream decoding can be correspondingly prioritized and with a limited available decoding time, a start can be made with the most promising code image zones. A scoring also allows a generalization to additional classification results that go beyond a binary "code/no code" and include code types, for example.

First candidates for 1D codes, first candidates for 2D codes, second candidates for 1D codes, and/or second candidates for 2D codes are preferably determined. A distinction is consequently made between 1D codes (barcodes) and 2D codes. The codes can be distinguished even further in accordance with the different known code types. The downstream decoder receives important information by such a differentiation as to which prioritized read attempts with which decoding process most likely lead to success and so better utilizes the available decoding time.

First candidates for 2D codes that are not simultaneously second candidates are preferably considered as a text image zone within the output image. A prominent structure is recognized by the classical image processing of the first segmentation process in such image zones. At the same time, the second segmentation process using machine learning has not been able to identify any form of code in this image zone. Evidence suggest that the structure to which the classical image processing has responded is a text area. This information can so-to-say be delivered as a side-effect for further processing to an OCR (optical character recognition) engine that creates similar advantage therefrom to the decoder from the code image zones. The text areas can in turn be processed and output in the form of a further result map (OCR result map, OCR heatmap).

The first segmentation process preferably determines first candidates in an output image divided into tiles. Only small image sections thereby have to be respectively processed in order, for example, to determine a contrast or to count brightness edges. The tiles can be worked through iteratively after one another, but also in parallel in any desired gradation. The first result map preferably includes one pixel per tile. The resolution of the second result map is either the same, i.e. the second segmentation process is correspondingly designed, or a standardization takes place for a resolution adaptation.

The first segmentation process preferably has a contrast determination in which first candidates have to have a minimum contrast. The light-dark transitions of the code elements provide a high contrast so that high contrast is a good distinguishing feature for recognizing first candidates for code image zones. The evaluation of the contrast preferably relates to one respective tile.

In the first segmentation process, brightness edges are preferably counted transversely to one another along two lines to determine a preferred direction with reference to the respective number of brightness edges and a first candidate for a 1D code is only recognized in the case of a preferred direction and otherwise a first candidate for a 2D code is in particular recognized. The two lines form a kind of test cross for both direction dimensions in the plane of the output image. At least one line extends transversely to the bar of a barcode and therefore through a high number of brightness edges if the zone to be tested contains a barcode. If this applies to neither of the two lines, it is precluded that a barcode is present. If the test of a criterion that recognizes a structure, for instance a high contrast, has taken place beforehand, this structure is not a barcode and can therefore in particular be assumed to be a 2D code. This is then possibly confirmed by the second segmentation process or finder patterns of a 2D code are sought in a further going test. A scatter print, a text area, or a misinterpretation of the preceding criteria are other possibilities. The test cross also preferably relates to a tile.

The second segmentation process preferably has a neural network, in particular a deep neural network or a convolutional neural network (CNN). This is a process of machine learning particularly proven for image processing. The second segmentation process can thus particularly reliably determine second candidates for code image zones.

The neural network is preferably trained by means of supervised learning using example images that are in particular evaluated using the results of a segmentation and/or decoding process without processes of machine learning. The supervised learning makes it possible to generalize to output images presented later in operation from a training data set with examples of a specified correct evaluation. Corresponding architectures of neural networks and algorithms for training and operation (inference) are known per se so that well-functioning solutions can be made use of or can be placed on top. Some citations were named in the introduction. The assignment of the correct evaluation to an example image, that is the annotation or labeling, can in principle take place by hand since the training takes place before the run time. The second segmentation process can furthermore be trained at least in part with example images that the first segmentation process has evaluated. This finally by no means only reproduces the first segmentation process with other means since the neural network finds its own evaluation and generalization by the training. At least one classical decoder can furthermore be used that evaluates example images and that only annotates code image zones retrospectively as a positive example when a code could actually be read there.

The optoelectronic code reader in accordance with the invention has a light reception element to generate image data from received light and thus to record the output image. The light receiver can be that of a barcode scanner, for example a photodiode, and the intensity profiles of the scans are assembled line-wise to form the output image. It is preferably an image sensor of a camera-based code reader. The image sensor can in turn be a line sensor for the detection of a code line or of an areal code image by assembling image lines or a matrix sensor, with recordings of a matrix sensor also being able to be joined together to form a larger output image. A network of a plurality of code readers or camera heads is likewise conceivable. A method in accordance with the invention of locating code image zones in accordance with one of the described embodiments is implemented in a control and evaluation unit that can itself be part of a barcode scanner or of a camera based code reader or can be connected thereto as a control device. The code image zones are subsequently communicated to external and/or are decoded to read the code contents of the codes in the code image zones.

Figure 2A:
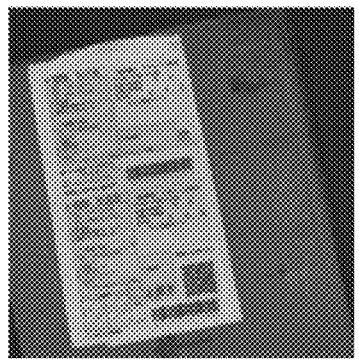
Figure 2B:
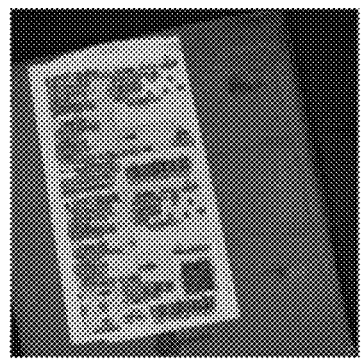
Figure 2C:
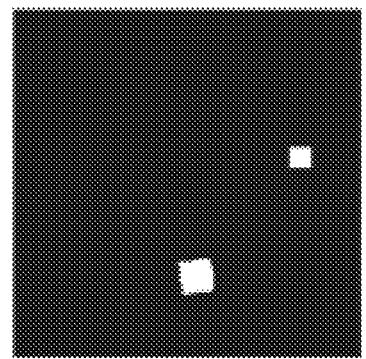
Figure 3:
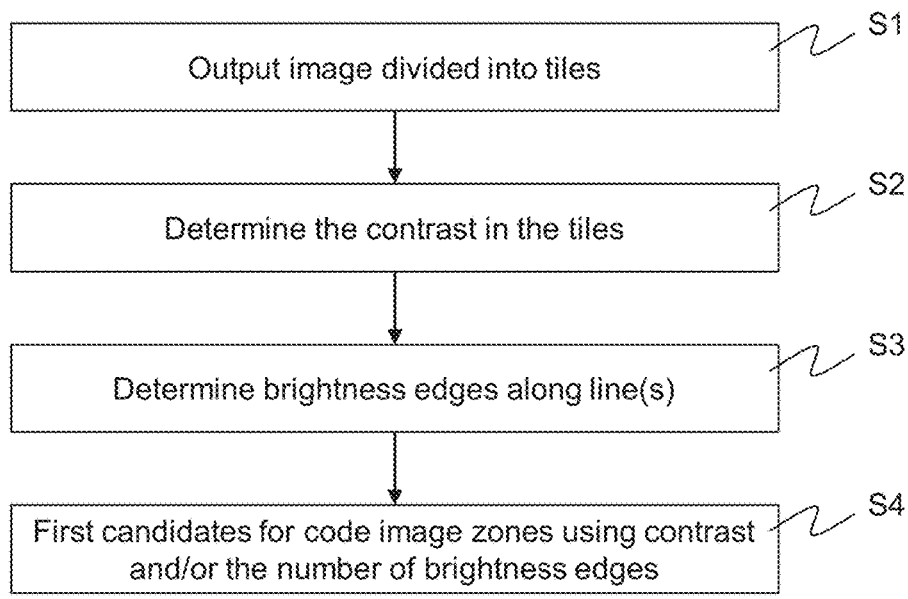
Figure 4:
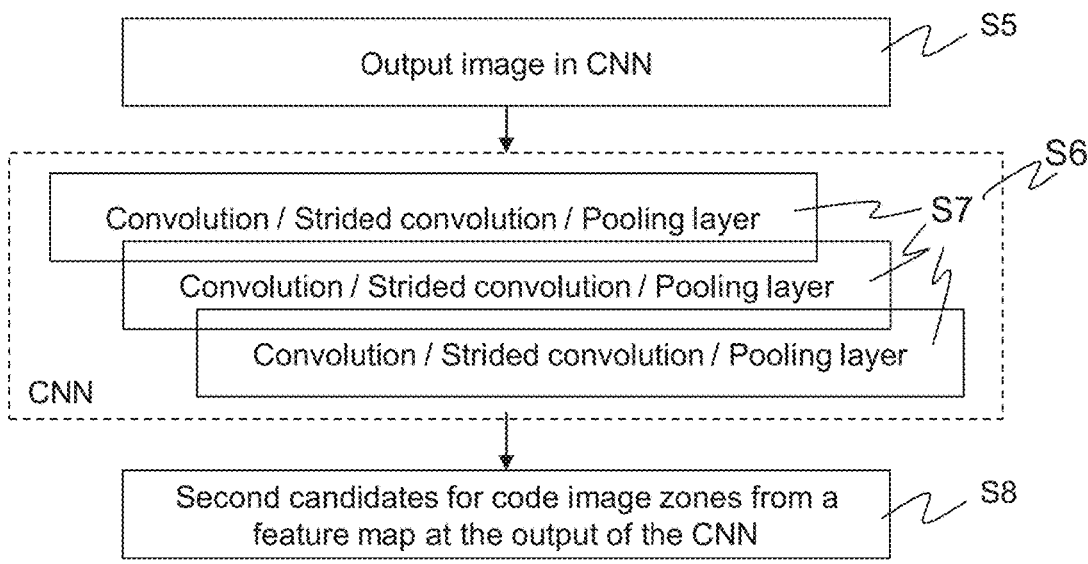
Figure 5:
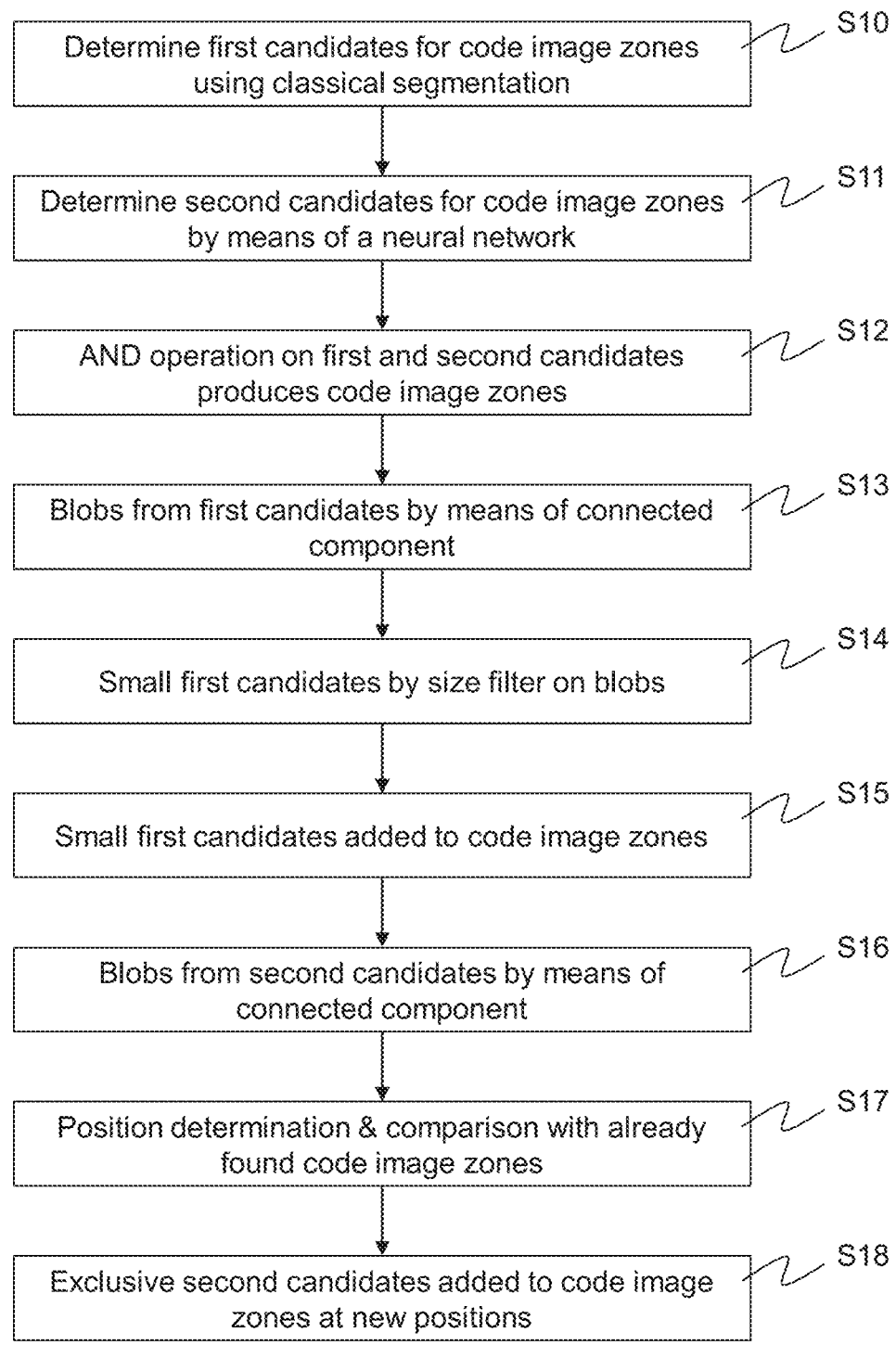
Figure 6A:
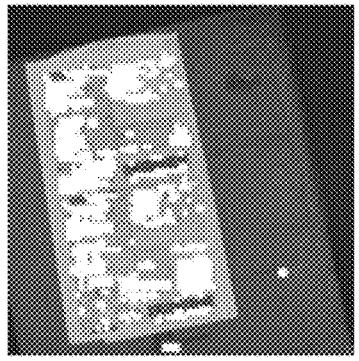
Figure 6B:
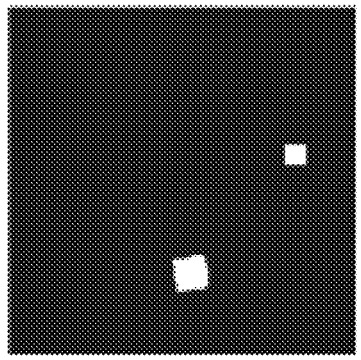
Figure 6C:
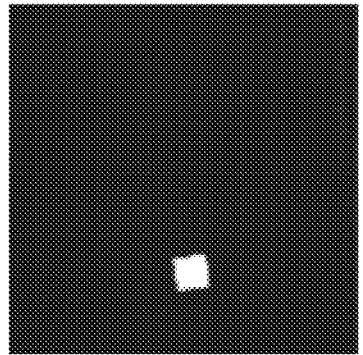
Figure 7A:
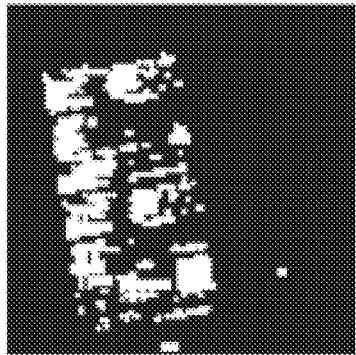
Figure 7B:
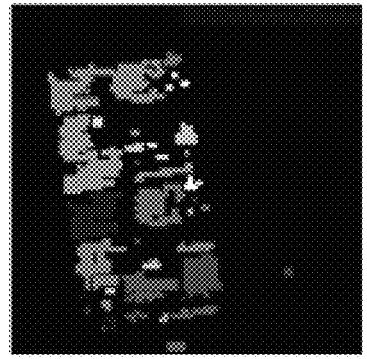
Figure 7C:
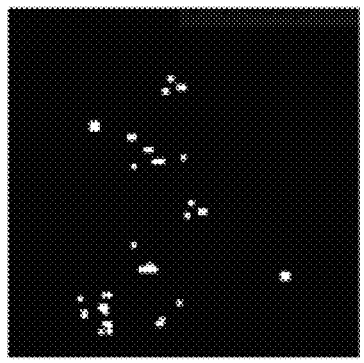
Figure 7D:
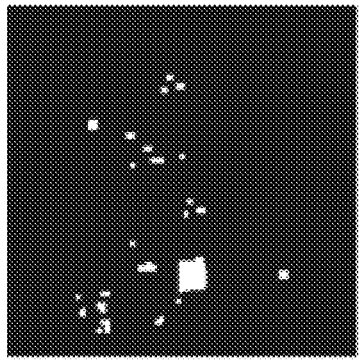
Figure 8A:
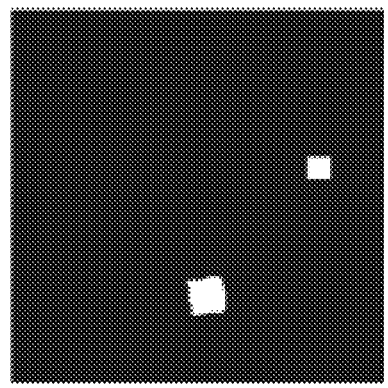
Figure 8B:
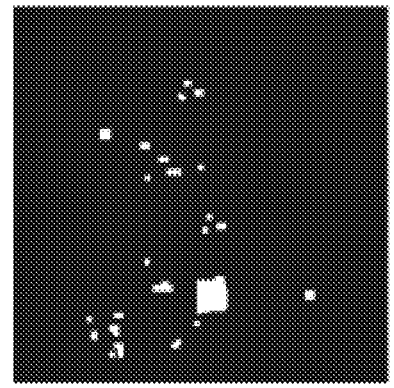
Figure 8C:
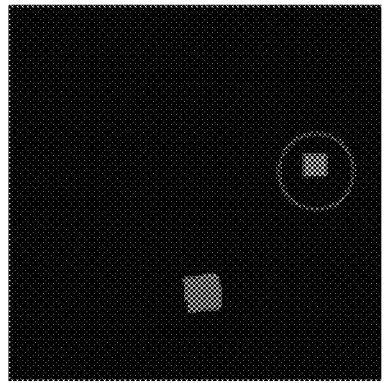

The invention will be explained in more detail in the following also with respect to further features and advantages by way of example with reference to embodiments and to the enclosed drawing. The Figures of the drawing show in:

FIG. 1 a schematic three-dimensional overview representation of the exemplary installation of a code reader above a conveyor belt on which objects having codes to be read are conveyed:

FIG. 2a an exemplary output image that was recorded by a code reader,

FIG. 2b first candidates for code image zones determined in the output image in accordance with FIG. 2a using a classical segmentation process;

FIG. 2c second candidates for code image zones determined in the output image in accordance with FIG. 2a by a segmentation process using a neural network;

FIG. 3 an exemplary flowchart for a classical segmentation process;

FIG. 4 an exemplary flowchart for a segmentation process using a neural network;

FIG. 5 an exemplary flowchart for a fusion of the results of a classical segmentation process and of a segmentation process using a neural network for locating code image zones;

FIG. 6a a first result map that again similar to FIG. 2b represents the first candidates for code image zones determined using a classical segmentation process:

FIG. 6b second result map that like FIG. 2c represents the second candidates for code image zones determined by a segmentation process using a neural network represents;

FIG. 6c a third result map that represents an AND operation of the first result map in accordance with FIG. 6a and of the second result map in accordance with FIG. 6b;

FIG. 7a the first result map in accordance with FIG. 6a in a cleaned up representation without superposed information of the output image;

FIG. 7b a representation of connected blobs that have been generated from the first candidates of the first result map in accordance with FIG. 7a by a connected component process;

FIG. 7c a fourth result map of those blobs in accordance with FIG. 7b that are smaller than a threshold value;

FIG. 7d a fifth result map in which the third result map in accordance with FIG. 6c is linked with the fourth result map in accordance with FIG. 7c by means of an OR operation;

FIG. 8a again for a direct comparison, the second result map in accordance with FIG. 6b;

FIG. 8b again for a direct comparison, the fifth result map in accordance with FIG. 7d;

FIG. 8c a sixth result map in which exclusive second candidates of the second result map in accordance with FIG.

Figure 8D:
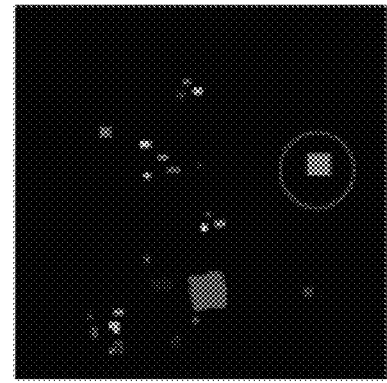

8a have been identified that are not located at the position of a first candidate or of a small first candidate; and FIG. 8d a seventh result map or overall result map in which the fifth result map in accordance with FIG. 8b. and the sixth result map in accordance with FIG. 8c have been linked by means of an OR operation.

FIG. 1 shows an optoelectronic code reader 10 in a preferred situation of use mounted above a conveyor belt 12 that conveys objects 14, as indicated by the arrow 16, through the detection zone 18 of the code reader 10. The objects 14 bear code zones 20 on their outer surfaces which are detected and evaluated by the code reader 10. These code zones 20 can only be recognized by the code reader 10 when they are affixed to the upper side or at least in a manner visible from above. Differing from the representation in FIG. 1, a plurality of code readers 10 can be installed from different directions for the reading of a code 22 affixed to the side or to the bottom, for instance, in order to permit a so-called omnireading from all directions. The arrangement of the plurality of code readers to form a reading system mostly takes place as a reading tunnel in practice. This stationary use of the code reader 10 at a conveyor belt is very common in practice. The invention, however, first relates to the code reader 10 itself and to the method implemented therein for decoding codes or even more specifically to a preprocessing step therefor so that this example may not be understood as restrictive.

The code reader 10 detects image data of the conveyed objects 14 and of the code zones 20 by an image sensor 24, said image data being further processed by a control and evaluation unit 26 by means of image evaluation and decoding processes. It is not the specific imaging process that is important for the invention so that the code reader 10 can be set up in accordance with any principle known per se. For example, only one line is detected in each case, whether by means of a linear image sensor or a scanning process, with a simple light receiver such as photodiode being sufficient in the last-named case. The control and evaluation unit 26 joins together the lines detected in the course of the conveyor movement to form the image data. A larger zone can already be detected in a recording using a matrix-like image sensor, with the assembly of recordings here also being possible both in the conveying direction and transversely thereto. The plurality of recordings are recorded consecutively and/or by a plurality of code readers 10 whose detection zones 18, for example, only cover the total width of the conveyor belt 12 together, with each code reader 10 only recording a part section of the total image and the part sections being assembled by image processing (stitching). An only fragmentary decoding within individual part sections with a subsequent stitching of the code fragments is also conceivable.

It is the object of the code reader 10 to recognize the code zones 20 and to read the codes affixed there. The recognition of the code zones 20 or the code image zones corresponding thereto in a recorded image is also called segmentation or presegmentation and will be explained in detail further below with respect to FIGS. 2a to 8d.

The code reader 10 outputs information such as read codes or image data via an interface 28. It is also conceivable that the control and evaluation unit 26 is not arranged in the actual code reader 10, that is the camera shown in FIG. 1, but is rather connected as a separate control device to one or more code readers 10. The interface 28 then also serves as a connection between an internal and external control and evaluation. The control and evaluation functionality can be distributed practically as desired over internal and external modules, with the external modules also being able to be connected via a network or cloud. No further distinction and made of this all here and the control and evaluation unit 26 is understood as part of the code reader 10 independently of the specific implementation. The control and evaluation unit 26 can comprise a plurality of modules such as an FPGA (field programmable gate array), a microprocessor (CPU), and the like. Specialized hardware components, for instance an AI processor, an NPU (neural processing unit), a GPU (graphics processing unit), or the like can in particular be used for the segmentation using a neural network still to be described. The processing of the image data, in particular the segmentation, can take place on the fly still during the reading of the image data or during the streaming, in particular in the manner such as is described for a neural network of a code reader in EP 3 916 633 A1 named in the introduction.

FIG. 2a shows an exemplary output image that was recorded, for example, by the code reader 10 in accordance with FIG. 1 and that alternatively originates from any other desired source. A package having a white label in the foreground that has numerous legends including a plurality of optical codes can be recognized in the background. It is the aim of the segmentation now to be described to localize the code image zones with the codes.

FIG. 2b shows the result of a first classical segmentation. The first candidates thereby found for code image zones or regions of interest (ROIs) are highlighted. They are marked as first candidates for a delineation with respect to second candidates introduced later of a second segmentation using a neural network. There are recognizably too many first candidates that still comprise numerous false positive code image zones.

FIG. 3 shows a flowchart for a classical segmentation process whose result is illustrated by way of example in FIG. 2b. The classical segmentation is generally based on comparatively simple processing rules that can also be carried out by an FPGA. The classical segmentation shown here is to be understood as purely exemplary; any image processing processes can be used that are known per se for the segmentation, with there being the restriction for the classical segmentation process that no process of machine learning and thus in particular no neural network is used.

In a step S1, the output image is divided into tiles, i.e. into image sections of, for example, 10×10 or a different number of pixels, that can also differ in the X and Y directions. The further processing can then take place tile-wise, with a parallelization over a plurality of tiles being possible.

In a step S2, the contrast per tile is determined since a homogeneous zone having little contrast does not contain any code. The gray values of the read pixels and their squares can already be summed on the fly, on an FPGA for example, for the contrast determination since the determination of the mean value and the standard deviation is then possible from these sum values without a repeat pixel access, with the latter being a contrast measurement.

In a step S3, transitions from light to dark, or vice versa, are counted along a line, preferably on a test cross of two lines perpendicular to one another. They are potential edges between code elements of which a minimum number is expected in a code image zone.

In a step S4, a contrast evaluation takes place, in particular against a contrast threshold. Tiles having too low a contrast are discarded; they not first candidates for code image zones. This evaluation can already take place directly at step S2; brightness edges then do not have to be determined at all for the tiles eliminated in this manner. The number of brightness edges are compared against an edge threshold in tiles having sufficient contrast and tiles having too low a number are likewise discarded. Finally, it is conceivable as a further criterion especially for locating code image zones having barcodes to evaluate the number of brightness edges along the two lines of the test cross to determine whether there is a preferred direction having a high number of brightness edges. Tiles without a clear preferred direction do not contain any barcode and are discarded or possibly still evaluated as a scatter print, a text area, or 2D code image zones. As mentioned, FIG. 3 only shows an example of a classical segmentation. Further steps are in particular conceivable, for instance a post-analysis of tiles that includes at least the directly adjacent tiles.

FIG. 2c shows the result of a second segmentation using a neural network. The second candidates thereby located for code image zones or regions of interest (ROIs) are highlighted. Only comparatively few second candidates are determined in comparison with the first candidates of the classical segmentation. The second segmentation for this purpose has recognized a very low contrast second candidate that the classical segmentation had overlooked and that cannot be recognized itself with the naked eye.

FIG. 4 shows an exemplary flowchart for a segmentation process using a process of machine learning whose result is illustrated by way of example in FIG. 2c. A neural network, in particular a deep neural network or a convolutional neural network (CNN) is particularly suitable for this.

In a step S5, the output image of the input layer of the neural network is supplied. The two segmentations explained with respect to FIG. 3 and FIG. 4 can take place consecutively or in parallel with one another.

In a step S6, the neural network generates the second candidates for code image zones in a plurality of layers S7 from the inputs (inference). Three layers S7 are shown purely by way of example; the architecture of the neural network should not be restricted; and the usual tools are possible such as feedforward and feedback or recurrent, the omission of layers (ResNets), and the like. The convolutional layers that effectively convolute the output image or, in deeper layers, the feature map of the preceding layer with a local filter are characteristic for a convolutional neural network. Resolution losses (downsampling) are possible here by larger displacement steps of the filter (strided convolution, pooling layer). The reduction of the resolution is desired, in particular in early layers, to be able to perform the inference fast enough at all and with limited resources. Contrary to the representation, the neural network can also comprise layers without convolution or pooling.

The neural network is trained in advance using example images with known code image zones (supervised learning). Such example images can be evaluated by hand (labeling, annotating). On the other hand, it is possible to evaluate example images using a classical decoder with classical segmentation and to retrospectively recognize code image zones using actually readable codes. Such classical means are very powerful particularly without time pressure in offline mode so that a plurality of training examples can be automatically generated.

In a step S7, the neural network has concluded its inference and the feature map delivers the sought second candidates for code image zones to its output.

A fine segmentation is still possible subsequently to the classical segmentation explained with respect to FIG. 3 and/or the segmentation using a neural network explained with respect to FIG. 4. The first candidates and the second candidates are preferably determined in the form of a result map (heatmap). It is an image of a resolution that corresponds to the tiles or to the last feature map at the output of the neural network and whose pixels thus represent a certain region of the output image of higher resolution. In the case of a binary result map, a pixel indicates whether a code image zone is in the represented image section of the output image or not. Alternatively, numerical values of the pixels can indicate an evaluation of the likelihood for a code (scoring value) and/or a specific code type. The first candidates form a first result map; the second candidates a second result map. As still to be explained with reference to FIG. 5, the results of the two segmentations are fused; the code image zones resulting therefrom can also be shown in the form of a further result map.

Downstream algorithms can optionally still operate on the result maps, and indeed on individual, several, or all result maps. An example is a differentiation of barcodes with reference to their preferred directions. A further example is a fine segmentation. Here, code image zones are no longer determined at the coarse resolution of tiles or feature maps, but rather in a finer resolution up to the original resolution of the output image. This can take place iteratively in interaction with respective decoding attempts since, as soon as the aim of reading the code information has been reached, further refinements of the segmentation would only be an end in itself. Conversely, it should be prevented by a segmentation that is as free of errors as possible that the fine segmentation and the decoder work in a complex manner by different attempts even through no code at all is actually present in the processed image sections.

To achieve a low error rate of the located code image zones, the results of the two segmentations are fused. The starting point here is that both segmentations show very different error behaviors. The classical segmentation only evaluates a tightly restricted local zone with its tiles. It evaluates fine structures and is therefore very sensitive. This is parameterizable in part, but thus also required manual setting. The high sensitivity is desired, on the one hand, since small code image zones are thereby also still recognized. On the other hand, the classical segmentation can poorly distinguish between code-like background structures such as lettering, logos, or package tapes, and actual code zones. A comparatively high number of false positive errors therefore results.

The second segmentation basically evaluates the whole output image. The resolution is reduced by specific convolution layers depending on the design (dilution, strides, pooling), which implicitly results in a resolution corresponding to tiles in the feature map at the output. Information of a larger neighborhood has nevertheless entered into these features. The distinguishing capability between background structures and actual code regions is large; there are as good as no false positive code image zones among the second candidates. Low contrast codes and codes in different marking techniques, for instance codes stamped in metal, are also reliably recognized. However, the earlier a resolution reduction takes place in the layers and for reasons of limited resources, this is as a rule very early so that there is the more the risk of overlooking fine structures. The neural network therefore tends to false negative results even if this is not an inherent problem of neural networks, but is rather due to the implementation on real hardware for code reader applications with an early resolution reduction.

The complementary error behavior of the two segmentations is utilized in accordance with the invention in that the results of the individual segmentations are evaluated together to locate code image zones. Embodiments of such a smart fusion should now be explained. The fusion preferably takes place at the level of result maps and is described as such, but a corresponding procedure is likewise possible in a different representation. In this respect, result maps are preferably binarized, that is indicate in their pixels whether a code image zone or a candidate therefor is determined in or at this position. Alternatively, they can also include scoring values for corresponding likelihoods and/or classification information such as code types.

FIG. 5 shows an exemplary flowchart for a fusion of the results of a classical segmentation process and of a segmentation process using a neural network for locating code image zones. The routine is illustrated in FIGS. 6a to 8d purely by way of example for the processing of the output image of FIG. 2a.

In a step S10, first candidates for code image zones are determined using a classical segmentation as was described by way of example with reference to FIG. 3. Applied to the output image in accordance with FIG. 2a, the first result map shown in FIG. 6a results. The image information of the output image is still superposed here purely for illustration; this image information is not part of the first result map. FIG. 6a corresponds to FIG. 2b.

In a step S11, second candidates for code image zones are determined using a second segmentation that uses processes of machine learning, in particular a neural network, as was described by way of example with reference to FIG. 4. Applied to the output image of FIG. 2a, the second result map shown in FIG. 6b results. FIG. 6b corresponds to FIG. 2c.

In an optional step, not shown, a standardization of the first and/or second result map or maps may be necessary. Depending on the size of the tiles in the classical segmentation and downsampling of the layers of the neural network, the pixels of the two result maps possibly represent image zones of different sizes. One of the result maps or both result maps will then be rescaled to bring them to the same resolution.

In a step S12, the fusion of the first and second candidates now starts that were located in steps S10 and S11, in particular of the first and second result maps. The following chain is preferably run through completely, but generally every step is to be considered optional; the result of the fusion then achieves the desired aims only in part, which, however, is still considerably better than a segmentation that works solely classically or only using a process of machine learning.

Four aims can be named that are preferably achieved together, but with the implementation of only one part of these aims having an advantage. The first aim consists of not losing small code image zones that only the sensitive first classical segmentation finds. The second aim consists of not losing larger code image zones that only the second segmentation exclusively finds using a method of machine learning. The third aim consists of avoiding the accumulation of a plurality of code image zones. As a fourth aim, as many false positive code image zones as possible should be eliminated.

In a first approximation, the first candidates and the second candidates of steps S10 and S11 are linked by a logical AND operation in step S12. At the level of binary and second result maps, this is a pixel-wise logical AND operation; in other representations, the double condition correspondingly has to be set that both segmentations confirm the respective code image zone.

FIG. 6c illustrates the result of step S12 in a third result map that is generated by an AND operation of the first result map in accordance with FIG. 6a and of the second result map in accordance with FIG. 6b; The first result map and the second result map preferably remain separately stored so that they are still available in later steps. Contrary to the first aim worded above, a large number of the first candidates from the first result map can in contrast recognizably be lost in the third result map Contrary to the second aim, one of the two second candidates from the second result map can furthermore also be lost. It is, for example, a low contrast code over a large area that the contrast criterion of the classical segmentation has sorted out. The third and fourth of the named aims are achieved.

Elevated scoring values can now optionally be assigned to the code image zones found in the third result map, provided that the result maps are not purely binary and include scoring values, because a confirmation by both segmentations is present here. These scoring values can be passed on to result maps generated later or can be further processed therein. The downstream decoder can utilize this for a prioritization to primarily evaluate the most promising code image zones or to not lose too much processing time in less promising code image zones.

In steps S13 to S15, small first candidates from the classical segmentation should now be added to pursue the first aim of the third result map, that is the AND operation of both segmentations. FIG. 7a again shows the first result map, now in a cleaned up representation without superposed image information of the output image.

In step S13, the first candidates are first complemented to form connection components, so-called blobs, with the aid of a connected component algorithm, for example. A blob describes a connected pixel group under the clear assumption that connected pixels of the result map represent the same code image zone. The blobs for the first result map in accordance with FIG. 7a are shown in FIG. 7b.

In step S14, a size filter is applied to the blobs to specifically keep only small first candidates. The size can, for example, be determined by the area, the number of pixels, an edge length, a diameter, or any other measure and can be compared with a threshold value. The motivation behind this size filter that larger code image zones are already reliably recognized by the second segmentation and are therefore already present in the third result map. Larger blobs should remain outside consideration in order not to falsify the information of the second map considered of higher value in this regard and thus of third result maps. The correspondingly filtered blobs or small first candidates form a fourth result map that is shown in FIG. 7c.

In step S15, the small first candidates are transmitted into the previous result, that is into the AND operation on the (original) first candidates and of the second candidates. This can in particular be understood as an OR operation on the third result map in accordance with FIG. 6c and of the fourth result map in accordance with FIG. 7c from which a fifth result map results that is shown in FIG. 7d. The fifth result map can be a modified third result map in implementation; the third and fifth result maps do not have absolutely have to be stored separately and the fourth result map is now also no longer absolutely needed. It is possible to give the added small candidates an adapted scoring value provided that the result maps include scoring values and are not binary. The first aim is now also achieved.

In steps S16 to S18, only second candidates determined with the second segmentation using a method of machine learning should exclusively be added to the previous result for the pursuing of the second aim. They are, for example, low contrast codes that are overlooked by the classical segmentation. Steps S13 and S15, on the one hand, and S16 to S18, on the other hand, are preferably applied cumulatively, but can be swapped over in order or only applied individually.

To better understand the starting situation of steps S16 to S18, for comparison FIG. 8a again shows the second result map of FIG. 6b and FIG. 8b again shows the previous result, namely the fifth result map in accordance with FIG. 7c.

In step S16, connected components or blobs are generated from the second candidates, for example by means of connected component algorithms or blobs. This is analogous to step S13, but now for the second candidates or the second result map. In the example shown, this step does not visibly change the second result map due to the few, clearly separated second candidates and the blobs are therefore not shown separately in a further Figure. There is absolutely a difference internally since is it now known that there are two candidates.

In step S17, a position is determined for every blob, for example its main focus. A check is then made for every blob whether a code image zone had already been recognized at its position, i.e. whether the corresponding pixel is already set at this position in the fifth result map in accordance with FIG. 8b. Second candidates at positions of already known code image zones are discarded. Only second candidates at new positions are exclusive second candidates, i.e. those that the segmentation alone has found using processes of machine teaching and only they are maintained. FIG. 8c illustrates this step. The second candidate at the bottom was already known and is discarded; only the circled second candidate at the top right is located at a new position and is an exclusive second candidate. A sixth result map can be generated that only comprises exclusive second candidates. Unlike in FIG. 8c, the lower, non-exclusive second candidate has consequently been removed in the sixth result map.

In step S18, the exclusive second candidates are added to the previously found code image zones. This can in particular be understood as an OR operation of the fifth result map in accordance with FIG. 8b with the sixth result map, with the sixth result map only comprising the circled exclusive candidate in accordance with FIG. 8c. A seventh result map or overall result map results that is shown in FIG. 8d, with the illustrated ring around the exclusive second candidate naturally not belonging to the result map.

Steps S16 to S18 ensure that the above-named second aim is also achieved that therefore no code image zones located by the second segmentation using methods of machine learning are lost. It may at first glance appear that a simple OR operation would have been sufficient between the second result map in accordance with FIG. 8a and the fifth result map in accordance with FIG. 8b. This would, however, infringe the third aim; small code image zones that are correctly separated by the classical segmentation could thereby again merge after all. This can be easily understood with so-called stack codes, that is a plurality of barcodes disposed above one another with only small gaps. The first segmentation can separate the barcodes. The second segmentation can possibly already do this at the start in step S11 or can only recognize it later as a common zone by the accumulation into blobs in step S16. An OR operation would now combine the barcodes into a single code image zone contrary to the third aim. The procedure in accordance with steps S16 to S18 prevents this because the second candidate or its blob is not an exclusive second candidate at the position of the stack code.

The overall result map in accordance with FIG. 8d allows the easy recognition that the small code image zones of the first segmentation are maintained over the one code image zone over which the two segmentations in accordance with the AND operation were united from the start and at the same time large area false positive code image zones were eliminated without losing the low contrasted exclusive second candidates of the second segmentation in so doing. No codes are thus overlooked, the rate of false negative errors is extremely low and is zero in the example. The remaining false positive code image zones are fewer and they are also small. Above all the eliminated large false positive code zones would be problematic since such larger legend areas, logos, graphics, and textures are particularly processing intensive and the great effort will also still be in vain in the end.

As an optional further step, address and text areas can be output to forward them, for example, to a downstream optical character reader (OCR). The idea here is that the second segmentation using processes of machine learning actually only selectively reacts to optical codes and does not react to legends, which is easily achieved in reality. All the first candidates are therefore potential text areas that are not simultaneously second candidates. Such regions can also be precluded if the first segmentation recognizes barcodes, for example using a preferred direction such as in steps S3 and S4. In an implementation with result maps, the AND-NOT operation of the first result map or the first result map cleared of barcodes can be written by the second result map. Small areas can subsequently be eliminated because texts as a rule take up a certain area. The text areas can be processed and output in the form of an OCR result map. It is possible to calculate an oriented frame for the text areas. The orientation can possible still be corrected using already performed decodings since codes and texts are typically aligned with one another, oriented on one another, and match in content or conclusions from adjacent codes are also conceivable on a text area with respect to its size, orientation, and also content.

Further embodiments are also conceivable alternatively to the particularly advantageous embodiments of a fusion of the results of both segmentations described with reference to FIG. 5. The first and second candidates can thus only be linked by an AND operation so that so-to-say the process in accordance with FIG. 5 is aborted at step S12. Only reliable code image zones thereby remain that can be run through in a small decoding time; however with the risk of overlooking codes and in particular small codes. This can by all means be accepted, for example, in applications in which only large codes are anyway expected. Alternatively, the first and second candidates can only have an OR operation so that the method in accordance with FIG. 5 is modified and then aborted in step S12 by the replacement of the AND with OR. This delivers a maximum of code image zones and is advantageous if sufficient decoding time is available and a particularly high reading rate is aimed for. The result of the second segmentation can be used in a further alternative only as a filter against false positive code image zones. If, for example, the fine segmentation alone produces too many code image zones after a first classical segmentation, code image zones are in particular eliminated dynamically that are not confirmed by the second segmentation. In yet a further alternative, the results of both segmentations are worked through side by side or after one another up to the fine segmentation and decoding. This is extremely run time intensive, but ensures the highest reading rate.

Said alternatives enable a control with respect to available decoding time and correspondingly aimed for run time. The following combinations can be applied in a rising sequence of decoding time and an achieved reading rate: A purely AND operation, a use of only the code image zones of the second segmentation, the fusion explained with reference to FIG. 5, the use of only code image zones of the first segmentation, possibly dynamically filtered by the second segmentation, the use of only the code image zones of the first segmentation, a purely OR operation, a double evaluation of the separate results of the first and second segmentations.

The invention claimed is:

1. A computer implemented method of locating code image zones in an output image of a code bearing object, comprising:
   generating the output image using at least one light receiver element to image the code bearing object;
   determining first candidates for the code image zones in a first segmentation process using a process of classical image processing without machine learning;
   determining second candidates for the code image zones in a second segmentation process using machine learning; and
   fusing the first and second candidates to locate the code image zones.

2. The method in accordance with claim 1,
   wherein the first segmentation process generates a first result map and/or the second segmentation process generates a second result map, with a result map being an image of lower resolution than the output image whose pixels comprise information on whether a code image zone has been recognized at the location of the pixel.

3. The method in accordance with claim 1,
   wherein, subsequently to the locating of the candidates place, a fine segmentation takes place in which the code image zones are delineated more finely.

4. The method in accordance with claim 1,
   wherein, subsequently to the locating of the candidates place, a fine segmentation takes place in which the code image zones are delineated more finely in the resolution of the output image.

5. The method in accordance with claim 1,
   wherein a code image zone is deemed to have been located in the output image where a first candidate and a second candidate have been determined or alternatively where a first or second candidate has been determined.

6. The method in accordance with claim 1,
   wherein the first candidates are complemented to form connected code image zones; and wherein only small first candidates are maintained that are smaller than a threshold size.

7. The method in accordance with claim 6,
   wherein the small first candidates are additionally considered as code image zones.

8. The method in accordance with claim 6,
   wherein the first candidates are complemented to form connected code image zones by means of connected component processes.

9. The method in accordance with claim 1,
   wherein the second candidates are complemented to form connected image zones; and wherein only exclusive second candidates are maintained whose position does not coincide with a position of an already located code image zone.

10. The method in accordance with claim 9,
    wherein the exclusive second candidates are additionally considered as code image zones.

11. The method in accordance with claim 9,
    wherein the second candidates are complemented to form connected image zones by means of connected component processes.

12. The method in accordance with claim 1,
    wherein a scoring is determined with respect to the first candidates, the second candidates, and/or the code image zones that indicates how reliably an optical code in the output image has been recognized at the represented position.

13. The method in accordance with claim 1,
    wherein first candidates for 1D codes, first candidates for 2D codes, second candidates for 1D codes, and/or second candidates for 2D codes are determined.

14. The method in accordance with claim 1,
    wherein first candidates that are not simultaneously second candidates are considered as a text image zone within the output image.

15. The method in accordance with claim 1,
    wherein the first segmentation process determines first candidates in an output image divided into tiles.

16. The method in accordance with claim 1,
    wherein the first segmentation process has a contrast determination in which first candidates have to have a minimum contrast.

17. The method in accordance with claim 1,
    wherein, in the first segmentation process, brightness edges are counted transversely to one another along two lines to determine a preferred direction with reference to the respective number of brightness edges and a first candidate for a 1D code is only recognized in the case of a preferred direction.

18. The method in accordance with claim 17,
    wherein, otherwise, a first candidate for a 2D code is recognized.

19. The method in accordance with claim 1,
    wherein the second segmentation process has a neural network.

20. The method in accordance with claim 19,
    wherein the neural network is a convolution neural network.

21. The method in accordance with claim 19,
    wherein the neural network is trained by means of supervised learning using example images that are in particular evaluated using the results of a segmentation and/or decoding process without processes of machine learning.

22. An optoelectronic code reader, comprising:
    at least one light receiver element for generating image data from received light from a code bearing object; and
    a control and evaluation unit configured for:
    determining first candidates for code image zones in the image data in a first segmentation process using a process of classical image processing without machine learning;
    determining second candidates for the code image zones in a second segmentation process using machine learning; and
    fusing the first and second candidates to locate the code image zones.

* * * * *